(12) United States Patent
Umemoto et al.

(10) Patent No.: US 6,196,692 B1
(45) Date of Patent: Mar. 6, 2001

(54) LIGHT CONDUCTIVE PLATE, SURFACE LIGHT SOURCE DEVICE, AND REFLECTION TYPE LIQUID-CRYSTAL DISPLAY

(75) Inventors: Seiji Umemoto; Shuji Yano; Hideo Abe, all of Osaka (JP)

(73) Assignee: Nitto Denko Corporation, Osaka (JP)

( * ) Notice: Subject to any disclaimer, the term of this patent is extended or adjusted under 35 U.S.C. 154(b) by 0 days.

(21) Appl. No.: 09/293,990

(22) Filed: Apr. 19, 1999

(30) Foreign Application Priority Data

Apr. 17, 1998 (JP) .................................................. 10-124239
Jul. 28, 1998 (JP) .................................................. 10-228705

(51) Int. Cl.$^7$ ........................................................ F21V 8/00
(52) U.S. Cl. .............................. 362/31; 362/330; 349/63; 349/65
(58) Field of Search ................................. 349/62, 63, 65; 362/26, 27, 31, 330

(56) References Cited

U.S. PATENT DOCUMENTS 5,341,231 * 8/1994 Yamamoto et al. .................... 362/31

FOREIGN PATENT DOCUMENTS

| 0 787 942 | 8/1997 | (EP) . |
| 0 879 991 | 11/1998 | (EP) . |
| 261684 | 11/1995 | (TW) . |
| 279206 | 6/1996 | (TW) . |
| 346635 | 12/1998 | (TW) . |

OTHER PUBLICATIONS

Patent Abstracts of Japan, vol. 11, No. 274 (P–612), Sep. 5, 1987 & JP 62 073206 A (Hitachi) Apr. 3, 1987 *Abstract.

* cited by examiner

*Primary Examiner*—Alan Cariaso
(74) *Attorney, Agent, or Firm*—Sughrue, Mion, Zinn, Macpeak & Seas, PLLC

(57) ABSTRACT

A reflection type liquid-crystal display which is excellent in contrast when viewed with or without illumination and also in display brightness and in which displayed images viewed through a light conductive plate are less apt to be disturbed, i.e., excellent in clearness, and are less apt to have a decrease in perceptibility caused by moire phenomenon; and to develop a light conductive plate and a surface light source device with each of which the liquid-crystal display can be fabricated.

A light conductive plate having, formed on the upper surface (11) thereof, a light-emitting means which serves to deflect incident light from an incidence-side edge (13) of the plate to emit the light through the lower surface (12) of the plate and further having, at least on the lower surface thereof, an antireflection layer (2) which enables incident light from the lower surface of the plate to pass through the upper surface of the plate; a surface light source device comprising the light conductive plate described above and a light source disposed by the incidence-side edge thereof; and a reflection type liquid-crystal display comprising the surface light source device described above and, disposed on the lower side thereof, a liquid-crystal cell having a reflecting layer.

The antireflection layer disposed on the lower surface inhibits the upper surface from emitting the leakage light which is superposed on displayed images to cause white blurring and a decrease in contrast, whereby satisfactory perceptibility is attained regardless of whether the display is in an illuminated or unilluminated state.

8 Claims, 4 Drawing Sheets

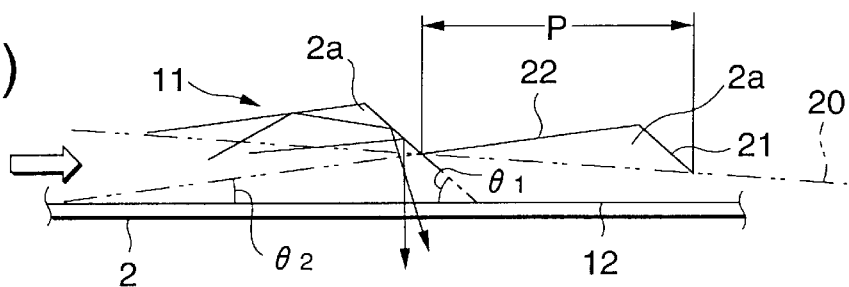
FIG.3(a)
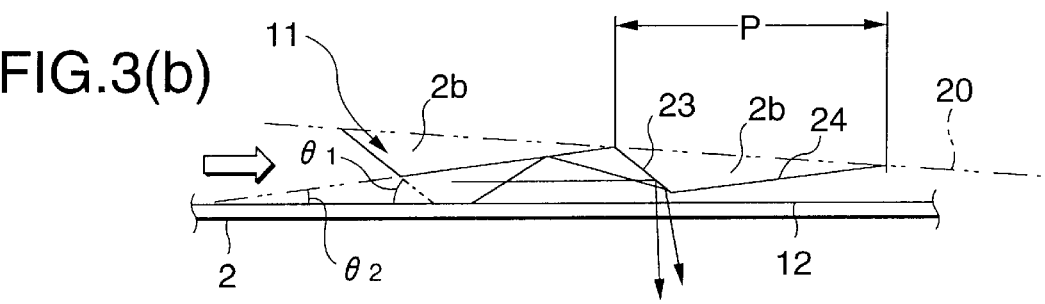
FIG.3(b)
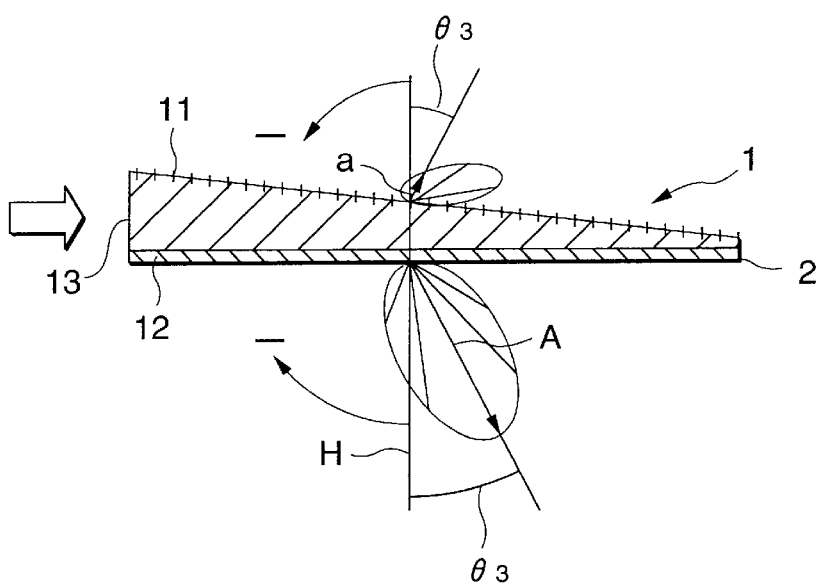
FIG.4
FIG.5
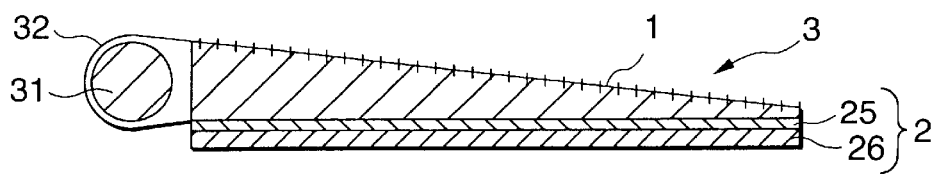

LIGHT CONDUCTIVE PLATE, SURFACE LIGHT SOURCE DEVICE, AND REFLECTION TYPE LIQUID-CRYSTAL DISPLAY

FIELD OF THE INVENTION

The present invention relates to a light conductive plate with which a reflection type liquid-crystal display which is bright and easy to view can be fabricated. The present invention further relates to a surface light source device which employs the light conductive plate and in which light can be utilized highly effectively.

BACKGROUND OF THE INVENTION

There is a desire for an illuminator which enables a reflection type liquid-crystal display to be read in the dark or the like. The present inventors attempted to apply a backlight for use in transmission type liquid-crystal displays to a front light system in which the backlight is disposed on the viewing side of a liquid-crystal cell. This backlight has a light conductive plate in which incident light from a side edge is emitted through a light-emitting means from one of the upper and lower surfaces. In the front light system, the displayed information is viewed through the light conductive plate.

However, the backlights employing conventional light conductive plates have been difficult to put to practical use because they pose problems that the display is insufficient in contrast in an illuminated state, has insufficient brightness in an unilluminated state, and has display disturbance, etc. For example, a liquid-crystal display having a light conductive plate employing diffusing dots or fine roughness as a light-emitting means has the following problems. The display is insufficient in contrast when viewed in an illustrated state. When viewed in an unilluminated state with external light, e.g., indoor lighting, the display is insufficient in contrast and has insufficient display brightness. In addition, the displayed images on the unilluminated display, which are viewed through the light conductive plate, are considerably disturbed and have poor clearness.

On the other hand, a light conductive plate has been proposed which employs as a light-emitting means a staircase-like prismatic structure having inclined faces with an angle of inclination of 45 degrees and flat faces with an angle of inclination of 0 degree (see JP-A-62-73206; the term "JP-A" as used herein means an "unexamined published Japanese patent application"). Even a liquid-crystal display having this light conductive plate has a problem that it is insufficient in contrast and display brightness when viewed in an illuminated state.

The above liquid-crystal display further had the following problem. Part of incident light is reflected by the lower surface of the light conductive plate without entering the liquid-crystal cell, etc., and leaks through the upper surface thereof. When this liquid-crystal display is viewed from the upper side, the resultant leakage light is superposed on displayed images, regardless of whether the display is in an illuminated state or not, to cause white blurring and reduced contrast, resulting in impaired perceptibility.

SUMMARY OF THE INVENTION

One object of the present invention is to provide a reflection type liquid-crystal display which is excellent in contrast when viewed with or without illumination and also in display brightness and in which displayed images viewed through a light conductive plate are less apt to be disturbed, i.e., excellent in clearness, and are less apt to have a decrease in perceptibility caused by moire phenomenon.

Another object of the present invention is to provide a light conductive plate and a surface light source device with each of which the liquid-crystal display can be fabricated.

The present invention provides a light conductive plate having, formed on the upper surface thereof, a light-emitting means which serves to deflect incident light from an incidence-side edge of the plate to emit the light through the lower surface of the plate and further having, at least on the lower surface thereof, an antireflection layer which enables incident light from the lower surface of the plate to pass through the upper surface of the plate.

The present invention further provides: a surface light source device comprising the light conductive plate described above and a light source disposed by the incidence-side edge thereof.

The present invention also provides a reflection type liquid-crystal display comprising the surface light source device described above and, disposed on the lower side thereof, a liquid-crystal cell having a reflecting layer.

BRIEF DESCRIPTION OF THE DRAWINGS

FIG. 3 is side views illustrating corrugated prismatic structures.

FIG. 4 is a view illustrated the light-emitting characteristics of one embodiment of the light conductive plate according to the present invention.

FIG. 5 is a sectional side view of a surface light source device.

DESCRIPTION OF SYMBOLS

Figure 1:
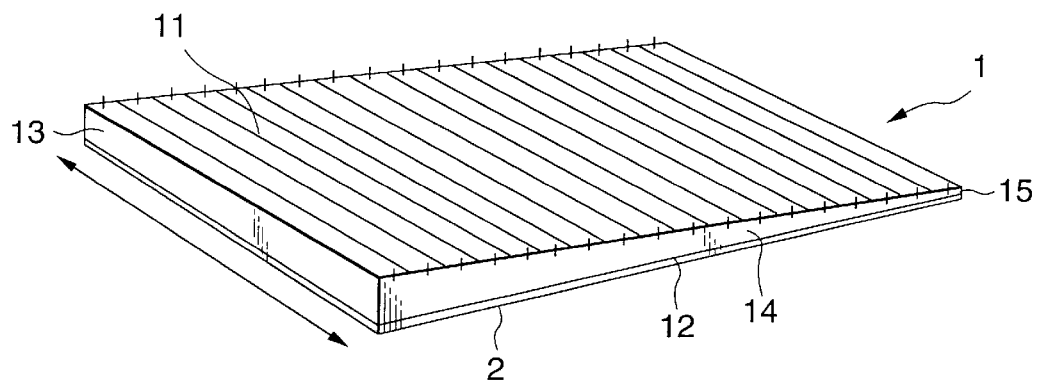
FIG. 1 is a slant view illustrating a light conductive plate.
Figure 2A:
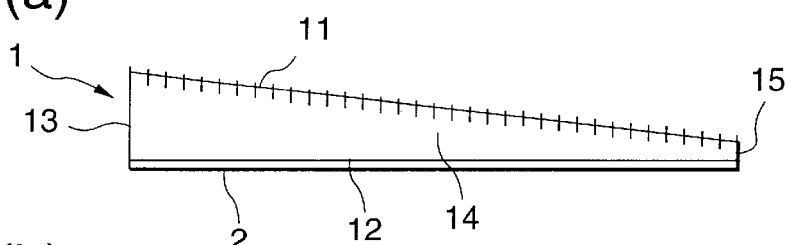
FIG. 2 is side views illustrating other light conductive plates.
Figure 2B:
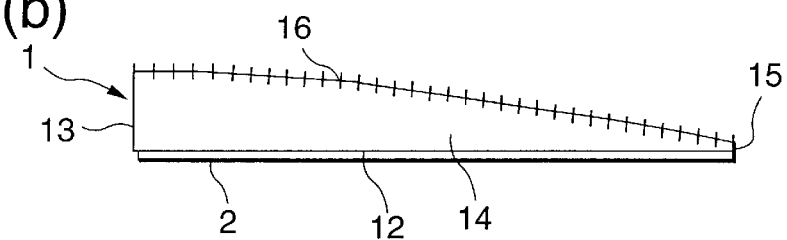
Figure 2C:
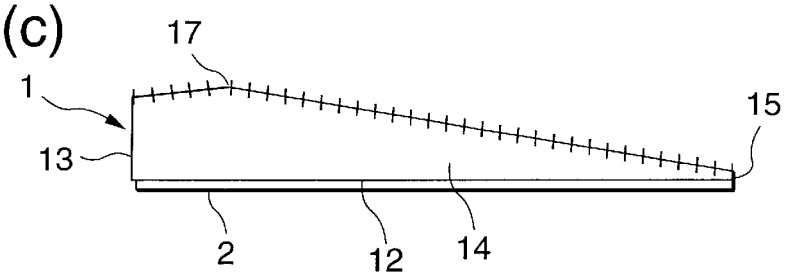
Figure 2D:
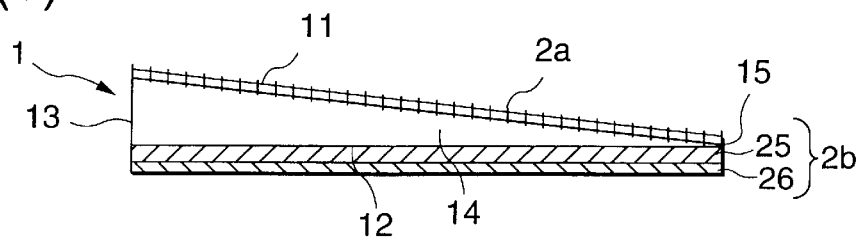

1: Light conductive plate
   11, 16, 17: Upper surface
     2a: Ridge part
     2b: Groove part
       21, 23: Narrow face
       22, 24: Wide face
   12: Lower surface
   13: Incidence-side edge
2: Antireflection layer
3: Surface light source device
   31: Light source
4: Diffusing layer
5, 51: Polarizing plate
6: Liquid-crystal cell
7, 64: Reflection layer

DETAILED DESCRIPTION OF THE INVENTION

According to the present invention, the antireflection layer formed at least on the lower surface of the light conductive plate functions in the following manners. The antireflection layer inhibits incident light from being reflected by the lower surface of the light conductive plate to cause leakage light without entering a liquid-crystal cell, etc. Namely, the antireflection layer inhibits generation of leakage light which, when the display is viewed from the upper side, is superposed on displayed images on the liquid-crystal cell to cause white blurring and reduced contrast. As a result, satisfactory perceptibility can be attained regardless of whether the display is in an illuminated or unilluminated state. The lower surface of the light conductive plate 1 is thought to have a reflectance of about from 3 to 5% with respect to each of light emitted into the light conductive plate $\delta$ and externally incident light $\in$ as shown by alternate long and two-short dash lines in FIG. 8. The reflected light hence considerably influences white blurring and contrast.

According to the present invention, a light conductive plate can be obtained in which light emitted through the lower surface is excellent in vertical directivity and leakage light from the upper surface is less apt to be superposed on displayed images. By use of this light conductive plate, a surface light source device in which light can be utilized highly effectively can be obtained. By use of the light conductive plate, a reflection type liquid-crystal display of excellent display quality can also be obtained which is excellent in contrast when viewed with or without illumination and also in display brightness and in which displayed images viewed through the light conductive plate are less apt to be disturbed, i.e., excellent in clearness, and are less apt to suffer moire phenomenon, which is caused by a light-emitting means.

Figure 9:
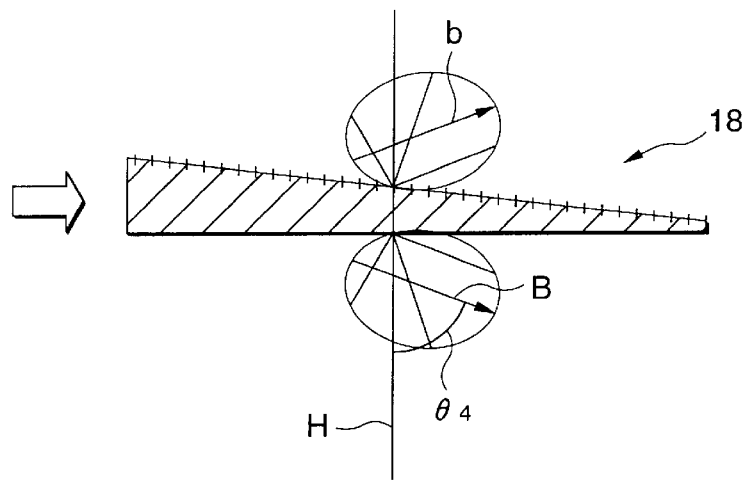
FIG. 9 is a view illustrating the light-emitting characteristics of a conventional light conductive plate.
Figure 10:
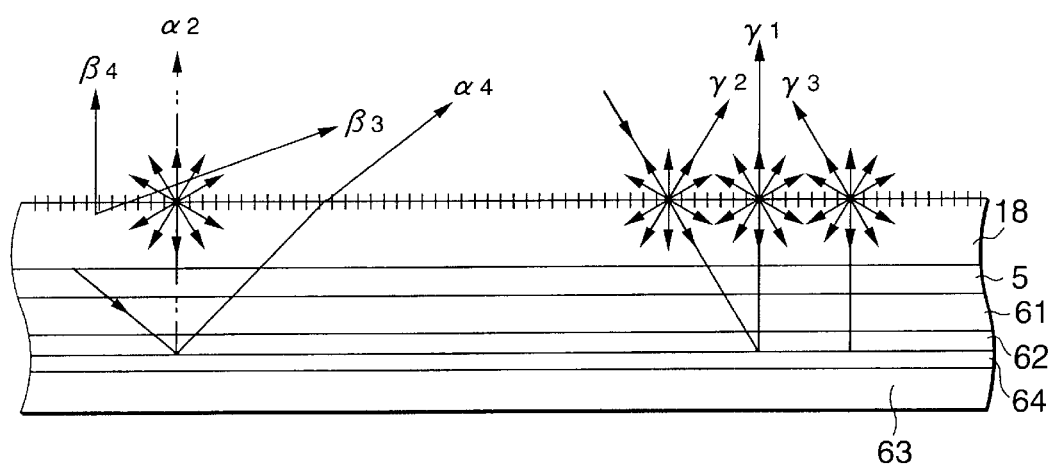
FIG. 10 is a view illustrating displayed images in a conventional reflection type liquid-crystal display.

The effects described above are attributable to special properties imparted to the light conductive plate. The present inventors made intensive studies in order to overcome the problems described above. As a result, they have found that the above-described light conductive plate employing conventional diffusing dots or fine roughness as a light-emitting means has the following drawbacks. As shown in FIGS. 9 and 10, transmitted light which has entered from a side edge is scattered in almost all directions due to the light-emitting means of the light conductive plate 18. Because of the scattering characteristics, emitted light $\alpha_1$ from the lower surface and leakage light $\beta_3$ from the upper surface respectively have maximum intensities B and b each in a direction $\theta_4$ which forms an angle of about 60 degrees with the line H (front direction) normal to the lower surface, and these intensity values are almost the same. Consequently, the quantity of light in a range of directions suitable for viewing, in particular in the viewing angle range of vertically from a direction about 15 degrees above that normal line to one about 30 degrees below the same and horizontally between right and left directions each forming an angle of about 30 degrees with that normal line, is too small and the display hence has poor brightness. In addition, emitted light $\alpha_2$ from the lower surface, which forms displayed images, is superposed on leakage light $\beta_4$ from the upper surface, resulting in poor contrast. Furthermore, in an unilluminated state, the display has poor contrast due to the white blurring of displayed images caused by the scattered light $\gamma_2$, and display lights $\gamma_1$ and $\gamma_3$ mix with each other due to scattering by the light conductive plate to considerably disturb displayed images.

The present inventors have further found that the light conductive plate disclosed in JP-A-62-73206, which has a prismatic light-emitting means, also has the problem of poor display quality like the light conductive plates described above. Specifically, leakage light from the upper surface generates in a large quantity and is superposed on emitted light from the lower surface, which forms displayed images, resulting in poor contrast. Furthermore, since emitted light having large emission angles generate in a large quantity, the quantity of light in the range of directions suitable for viewing is small, resulting in reduced display brightness.

Consequently, in order for a light conductive plate to enable the formation of bright clear displayed images, incident light from a side edge should be emitted from the lower surface with satisfactory directivity. In particular, as shown in FIG. 4, the incident light should be emitted (A) with satisfactory directivity in a direction which forms an angle $\theta_3$ as small as possible with the direction of a line H normal to the lower surface, especially in the viewing angle range. In reflection type liquid-crystal displays, even and clear displayed images are obtained usually by using a reflecting layer having a roughened surface with an average diffusion angle of about from 5 to 15 degrees. Consequently, if the quantity of light which strikes on the reflecting layer at a large angle is large (such as B in FIG. 9 and $\alpha_1$ in FIG. 10), the quantity of light in the range of directions suitable for viewing is small, making it difficult to obtain bright display. Furthermore, when such conventional liquid-crystal displays are viewed from a direction considerably apart from the front direction, display inversion is apt to occur and problems such as enhanced coloring are apt to arise in electric-field birefringence type displays.

For improving contrast, a light conductive plate is required to have such a constitution that the superposition of leakage light "a" from the upper surface on emitted light A from the lower surface, which forms displayed images, is minimized especially in the viewing angle range, as shown in FIG. 4. Since the ratio of the quantity of the leakage light to that of the emitted light in reflection type liquid-crystal displays is generally from 1:5 to 1:20, the superposition of the leakage light on displayed images considerably influences contrast.

For preventing the disturbance of displayed images, a light conductive plate is required to have such a constitution that the scattering of light passing therethrough from the upper to the lower surface and that of light passing therethrough from the lower to the upper surface are minimized. The front light in reflection type liquid-crystal displays is an auxiliary light source which enables viewing in the dark, and reflection type liquid-crystal displays should basically be viewed with external light such as indoor light or natural light for the purpose of reducing power consumption. Consequently, if the entrance of external light is inhibited by the light conductive plate in an unilluminated state, the display becomes dark. If the light conductive plate causes scattering, the results are reduced contrast due to surface whitening and disturbance of displayed images due to light mixing, etc.

In addition, from the standpoint of improving display quality, moire-free clear display is desired. since liquid-crystal displays generally have a pixel pitch of from 100 to 300 $\mu$m, it is desired to minimize the influence of the light conductive plate on transmitted light to thereby enable information images having a pitch of about 100 $\mu$m to be clearly perceived. Namely, it is desired to inhibit the occurrence of a moire caused by interference with pixels and to thereby obtain satisfactory display quality.

In the light conductive plate of the present invention, incident light from the incidence-side edge is deflected by the light-emitting means formed on the upper surface of the plate and thus emitted through the lower surface thereof.

Furthermore, incident light from the lower surface of the plate passes through the upper surface of the plate due to the antireflection layer formed on the lower or upper surface of the plate. Embodiments of the light conductive plate are shown in FIG. 1 and FIGS. 2(a) to (d). Numeral 1 denotes a light conductive plate and numerals 11, 16, and 17 denote an upper surface having a light-emitting means formed thereon. Numeral 12 denotes a lower surface serving as a light-emitting side, 13 an incidence-side edge, 14 a cross side edge, and 15 an edge opposite to the incidence-side edge. Furthermore, 2d denotes an antireflection layer formed on each of the upper surfaces 11, 16, and 17, and 2 denotes an antireflection layer formed on the lower surface 12.

The light conductive plate of the present invention, in which incident light from the incidence-side edge is deflected by the light-emitting means formed on the upper surface thereof and thus emitted through the lower surface thereof as described above, generally comprises a platy material having an upper surface, a lower surface facing the same, and side edges connecting the upper surface to the lower surface and including an incidence-side edge. Although the platy material may have an even thickness, it preferably has such a shape that the thickness of the edge 15 opposite to the incidence-side edge 13 is smaller than that of the incidence-side edge 13, in particular, not larger than 50% of the thickness of the incidence-side edge 13, as shown in the figures.

Due to the reduced thickness of the opposite edge, the light incident on the incidence-side edge as shown by the open arrows in FIGS. 3 and 4 efficiently strikes on the light-emitting means formed on the upper surface, before it reaches the opposite edge. The light which has thus adhered on the light-emitting means is emitted from the lower surface through reflection, etc., whereby the incident light can be effectively supplied to the target surface. The tapered shape has another advantage that the light conductive plate can have a reduced weight. For example, in the case of a light conductive plate in which the upper surface is flat as in FIG. 2(a), its weight can be about 75% of that of a light conductive plate having an even thickness.

The light conductive plate is not particularly limited as long as it shows the emission characteristics described above. The light-emitting means to be disposed on the upper surface of the platy material can hence have a suitable constitution showing such properties. However, a light-emitting means comprising a corrugated prismatic structure is preferred mainly from the standpoint that emitted light with excellent vertical directivity is obtained from the lower surface thereof.

The corrugated prismatic structure may be constituted of alternating ridges and grooves in which all faces have the same width. However, from the standpoints of effective utilization of light, etc., the structure is preferably constituted of alternating ridges and grooves which have narrow faces and wide faces. Examples of such corrugated prismatic structure are shown in FIGS. 3(a) and (b), wherein 2a denotes a ridge part, 2b a groove part, 21 and 23 a narrow face, and 22 and 24 a wide face. Whether a part of the structure is a ridge part or groove part is judged based on a line drawn through points at each of which a narrow face meets a wide face. Namely, when a point (vertex) at which a narrow face meets a wide face is above or below the line, the corresponding part is taken as a ridge part or groove part, respectively.

For example, in the case of the corrugated prismatic structure shown in FIG. 3, the alternate long and two-short dash line 20 which extends through points at each of which a narrow face and a wide face (faces 21 and 22 or faces 23 and 24), which from a ridge part 2a or a groove part 2b, meet each other is used as the base. When a point (vertex) at which a narrow face meets a wide face is above or below the line 20, the corresponding part is taken as a ridge part or groove part, respectively.

A preferred light conductive plate mainly from the standpoint of preventing a decrease in contrast caused by the superposition of leakage light from the upper surface thereof on displayed images formed by emitted light from the lower surface is shown in FIG. 4. In this light conductive plate, incident light (open arrow) from the incidence-side edge 13 is mostly emitted through the lower surface 12 and partly leaks through the upper surface. The direction $\theta_3$ in which the emitted light from the lower surface 12 has a maximum intensity A forms an angle not larger than 30 degrees with the line H normal to the lower-side reference plane, and the maximum intensity of the leakage light from the upper surface within the range of directions each forming an angle not larger than 30 degrees with the normal line H is not higher than one-fifth the maximum intensity A on the lower side.

The leakage light from the upper surface within that direction range is apt to be superposed on the reflected light which was the emitted light from the lower surface having the maximum intensity A and which has been reflected by a reflecting layer. If the ratio of (the maximum intensity of upper-surface leakage light)/(the maximum intensity of lower-surface emitted light) is too large, the relative intensity of displayed images is apt to be reduced and contrast is hence apt to be reduced.

A more preferred light conductive plate mainly from the standpoint of obtaining a reflection type liquid-crystal display improved in display quality, e.g., brightness and contrast, is one in which within a plane perpendicular to both the incidence-side edge 13 as one reference plane and the lower surface 12 as the other reference plane (i.e., within the plane of the section shown in the figure), $\theta_3$ is not larger than 30 degrees, preferably not larger than 25 degrees, most preferably not larger than 20 degrees, as shown in FIG. 4.

The above-described more preferred light conductive plate further has the following property. On the assumption that the incidence-side edge 13 is on the negative side based on the normal line H, the intensity of leakage light "a" from the upper surface 11 as measured in the direction forming the same angle $\theta_3$ with the normal line H as the direction for the maximum intensity A is not higher than 1/10, preferably than 1/15, more preferably than 1/20 the maximum intensity A. Since the leakage light "a" is superposed on the regularly reflected light of the light having the maximum intensity A, too large values of the ratio a/A reduce the relative intensity of displayed images, resulting in reduced contrast.

A preferred light-emitting means mainly from the standpoint of attaining property requirements concerning the direction for maximum intensity, the ratio of maximum intensity/leakage light intensity, etc. is shown in FIG. 3. It has a corrugated prismatic structure comprising ridges and grooves (2a or 2b) which have narrow faces ($\theta_1$) each having an angle of inclination of from 30 to 45 degrees with respect to the lower surface 12 as a reference plane and wide faces ($\theta_2$) each having an angle of inclination of from 0 to 10 degrees, excluding 0 degree.

The narrow faces 21 and 23, which decline from the incidence-side edge (13) to the opposite edge (15), serve to reflect that part of incident light from the incidence-side edge which strikes thereon, and to thus supply the reflected light to the lower surface (light-emitting surface). In this case, by regulating the narrow faces so as to have an angle of inclination $\theta_1$ of from 30 to 45 degrees, transmitted light can be reflected nearly perpendicularly to the lower surface as shown by the polygonal arrows in FIG. 3. As a result, lower-surface emitted light having a maxim intensity A in a direction $\theta_3$ which forms an angle not larger than 30 degrees with the line H normal to the lower side is efficiently obtained as shown in FIG. 4.

From the standpoints of the above-described performance requirements such as diminishing leakage light, inhibiting leakage light from impairing perceptibility, etc., the angle of inclination $\theta_1$, of the narrow faces is preferably from 32 to 43 degrees, more preferably from 35 to 42 degrees. If the angle of inclination $\theta_1$ of the narrow faces is smaller than 30 degrees, the lower-surface emitted light has a maximum intensity in a direction forming a large angle with the normal line and this tends to result in a reduced quantity of light suitable for viewing and hence in reduced brightness. If the angle of inclination $\theta_1$ exceeds 45 degrees, the quantity of leakage light from the upper surface tends to increase.

On the other hand, the wide faces not only serve to reflect transmitted light incident thereon and supply the reflected light to the narrow faces, but are intended, in a reflection type liquid-crystal display, to permit displayed images from the liquid-crystal cell to pass therethrough. From this standpoint, the angle of inclination $\theta_2$ of the wide faces is preferably from 0 to 10 degrees, excluding 0 degree, with respect to the lower-side reference plane (12).

Due to such inclination of the wide faces, transmitted light incident on the wide faces 22 and 24 at angles larger than the angle of inclination $\theta_2$ is reflected by the wide faces as shown by polygonal arrows in FIG. 3. In this case, the transmitted light is reflected, according to the angle of inclination of the wide faces, in directions closer to the direction parallel to the lower surface 12, and the reflected light strikes on the narrow faces 21 and 23, which in turn reflects the incident light. Thus, the reflected light is emitted through the lower surface 12. This emitted light has satisfactory directivity due to the parallel alignment.

As a result, besides the transmitted light which strikes directly on narrow faces, the transmitted light which first strikes on wide faces and then strikes on narrow faces through reflection by the wide faces can be supplied to the lower surface through reflection by the narrow faces. Consequently, the efficiency of light utilization can be improved accordingly. In addition, the light which has been reflected by wide faces and strikes on narrow faces can have a constant angle of incidence thereon and, hence, reduced fluctuations of angle of reflection can be attained. Namely, the emitted light can be aligned parallel.

Therefore, by regulating the angle of inclination of the narrow faces and that of the wide faces, the emitted light can be made to have directivity. As a result, light can be emitted perpendicularly to the lower surface or in directions nearly perpendicular thereto.

If the angle of inclination $\theta_2$ of the wide faces is 0 degree, the effect of aligning transmitted light in parallel is lessened. If the angle of inclination $\theta_2$ exceeds 10 degrees, the percentage incidence on the wide faces is reduced and light supply to regions close to the opposite edge side becomes insufficient. As a result, illumination is apt to become uneven. In addition, such large angles of inclination of the wide faces impose limitations on the sectional shape of the light conductive plate. Namely, thickness reduction is difficult on the side opposite to the incidence side. As a result, the quantity of light incident on the corrugated prismatic structure tends to decrease and the luminous efficiency also tends to decrease. The degree of inclination $\theta_2$ of the wide faces is preferably 8 degrees or smaller, more preferably 5 degrees or smaller, mainly from the standpoint of the above-described performance requirements such as the impartation of directivity to emitted light by the parallel alignment of transmitted light, diminution of leakage light, etc.

Mainly from the standpoint of obtaining satisfactory perceptibility of displayed images through the wide faces of the light conductive plate, the wide faces preferably satisfy that the largest difference in angle of inclination $\theta_2$ among all wide faces in the light conductive plate is within 5 degrees, preferably within 4 degrees, more preferably within 3 degrees, and that the difference in angle of inclination $\theta_2$ between any adjacent wide faces is within 1 degree, preferably within 0.3 degrees, more preferably within 0.1 degree.

As a result, the influence of the wide faces, through which displayed images are viewed, on the displayed images due to differences in angle of inclination $\theta_2$, etc. can be lessened. If the light which is passing through the wide faces is deflected thereby in directions considerably different from part to part, the displayed images become unnatural. In particular, if the degree of deflection of transmitted images considerably differs in an area close to pixels located close to each other, considerably unnatural displayed images tend to be observed.

The above explanation on the difference in angle of inclination $\theta_2$ was made on the assumption that the angle of inclination $\theta_2$ of each wide face is within the aforementioned range of from 0 to 10 degrees, excluding 0 degree. Namely, the assumption is that the wide faces have been regulated so as to have such a small angle of inclination $\theta_2$ and so that the deflection of displayed images by refraction upon passing therethrough is reduced to a degree within an allowable range. This is intended not to change the optimal viewing direction for a liquid-crystal display which direction is close to the vertical direction.

If displayed images are deflected, the optimal viewing direction shifts to a direction outside the range close to the vertical direction. If displayed images are deflected considerably, the direction of the deflected light is close to the direction of leakage light emitted from the upper surface of the light conductive plate. This may often cause a decease in contrast, etc. The reasons why the angle of inclination $\theta_2$ of the wide faces has been regulated to a value of from 0 to 10 degrees, excluding 0 degree, include that the influence of the wide faces on the scattering of transmitted light is diminished to a negligible level.

From the standpoint of obtaining bright displayed images, the light-emitting means is preferably one which is excellent in the efficiency of external light incidence and in the transmission of displayed images on a liquid-crystal cell or the efficiency of emission of the displayed images. In view of this, the light-emitting means is preferably a corrugated prismatic structure in which the projected area of the wide faces on the lower-side reference plane is at least 5 times, preferably at least 10 times, more preferably at least 15 times, that of the narrow faces. As a result, most of displayed images on a liquid-crystal cell can be transmitted through the wide faces.

When displayed images on a liquid-crystal display are transmitted, part of the displayed images which have struck on the narrow faces are reflected toward the incidence-side edge and are not emitted through the upper surface. The remaining part thereof is deflected and emitted in a direction which is considerably different from the direction of emission of displayed images through the wide faces and is on the side opposite to the direction of that emission based on the line normal to the lower surface. Consequently, the thus-deflected and emitted light exerts almost no influence on the displayed images which have passed through the wide faces. From this standpoint, the narrow faces are preferably not localized over pixels of the liquid-crystal cell. If the narrow faces overlie all pixels, in an extreme case, displayed images are hardly perceived through the wide faces in a direction close to the vertical direction.

Consequently, mainly from the standpoint of avoiding unnatural display due to insufficient transmission of display light, it is preferred to reduce the area in which narrow faces overlap pixels to thereby ensure a sufficient light transmission through the wide faces. In view of the fact that the pixel pitches of liquid-crystal cells are generally from 100 to 300 μm and in view of the above-described point and ease of the formation of the corrugated prismatic structure, the narrow faces have preferably been formed so that each narrow face has a projected width on the lower-side reference plane of 40 μm or smaller, preferably from 1 to 20 μm, more preferably from 3 to 15 μm. In this connection, it is noted that the smaller the projected width, the higher the level of technique required for forming the narrow faces. If the ridge parts of the corrugated prismatic structure have a radius of curvature not lower than a given value, a scattering effect is produced and this may cause disturbance of displayed images, etc. Furthermore, in view of the fact that fluorescent lamps generally have a coherent length of about 20 μm, too small projected widths of the narrow faces tend to cause diffraction, etc., resulting in impaired display quality.

The narrow faces are preferably arranged at large intervals from the above standpoint. However, since the narrow faces on one hand function to substantially emit incident light from a side edge as described above, too large intervals therebetween result in thin illumination and this also may result in unnatural display. In view of these, the pitch P of the ridges 2a and grooves 2b in the corrugated prismatic structure, as shown in FIG. 3, is preferably from 50 μm to 1.5 mm. The pitch may be constant throughout the corrugated prismatic structure. Alternatively, the ridges 2a and grooves 2b may be arranged at irregular pitches such as, e.g., random pitches or a random or regular combination of a given number of pitches.

When the light-emitting means comprises a corrugated prismatic structure, there are cases where the prismatic structure interferes with the pixels of a liquid-crystal cell to cause a moire. Although moire generation can be prevented by regulating the pitch of the ridges and grooves, there is a preferred range for the pitch thereof as described above. Consequently, the problem is to eliminate a moire generating in that pitch range.

In the present invention, it is preferred to employ a technique for moire prevention in which the ridges and grooves of a corrugated prismatic structure are arranged in an inclined state with respect to the incidence-side reference plane so that the direction of this inclined arrangement intersects a direction of pixel arrangement. In this case, if the angle of inclination is too large, the light incident on the narrow faces is reflected in undesirable directions and the resultant emitted light is deflected considerably. As a result, the intensity of illumination considerably varies along the direction of light transmission in the light conductive plate and the efficiency of light utilization is reduced. This tends to cause a decrease in display quality.

From the above standpoint, the direction of the arrangement of the prismatic ridges and grooves, i.e., the angle of inclination of the ridgelines of the prismatic ridges and grooves, with respect to the incidence-side reference plane is preferably within ±35 degrees, more preferably ±30 degrees, most preferably ±25 degrees. The symbol ± means that the direction of inclination is based on the plane of the incidence-side edge. In the case where moire generation is negligible, the prismatic ridges and grooves are preferably arranged in a direction as parallel as possible to the incidence-side edge.

As described hereinabove, the light conductive plate may have a suitable shape. In the case where a wedge-shaped or similar light conductive plate is to be produced, its shape can be suitably determined. The upper surface thereof can have a suitable shape such as, e.g., the flat plane 11 shown in FIG. 2(a) or the curved surfaces 16 and 17 shown in FIGS. 2(b) and (c).

With respect to the corrugated prismatic structure constituting a light-emitting means, the ridges and grooves need not be formed by flat faces such as the faces 21, 22, 23, and 24 shown in FIG. 3, and may have a suitable configuration containing bent faces, curved faces, etc. The corrugated prismatic structure may comprise a combination of ridges and grooves which vary not only in pitch but in shape, etc. Furthermore, the corrugated prismatic structure may be one in which each ridge or groove extends continuously throughout the width of the structure so as to have a continuous ridgeline, or may be one in which the ridges or grooves are discontinuously arranged, in the direction of ridgelines, at a given interval.

As in the embodiments shown in figures, the upper surface 11, 16, or 17 or the lower surface 12 of the light conductive plate 1 has an antireflection layer 2d or 2. Preferably, the light conductive plate has an antireflection layer or a flat plane or the like. This is intended to inhibit reflection at the lower surface of the light conductive plate to thereby inhibit leakage light from being emitted from the upper surface and being superposed on displayed images to impair contrast, etc. The antireflection layer can be an optical multilayered film, a low-refractive-index layer, or the like which is formed according to a conventional technique from, e.g., transparent dielectrics, fluoropolymers, and low-density materials.

A preferred antireflection layer shows antireflecting properties throughout the whole visible light region. In particular, the preferred antireflection layer has a reflectance of 1.5% or lower, preferably 1.3% or lower, more preferably 1.0% or lower, with respect to vertically incident light having wavelength of 550 nm, which is intermediate in the visible light region and is in a visually important range.

The antireflection layer may be directly formed on the lower surface of the light conductive plate by vapor deposition or another technique. Alternatively, an anti reflection sheet or the like which comprises a transparent substrate 25 consisting of, e.g., a film, and an antireflection layer 26 formed on one side of the substrate 25 may be applied as an anti reflection layer 2 to the lower surface of the light conductive plate in such a manner that the antireflection layer 26 faces outward.

In the case where an antireflection layer is formed by applying the above-described antireflection sheet or the like, the antireflection layer formed is preferably in intimate contact with the lower surface of the light conductive plate so as to avoid inclusion of an air layer therebetween from the standpoints of antireflection, etc. For attaining the intimate contact, an appropriate adhesive means can be used, such as a pressure-sensitive adhesive layer or another adhesive layer.

By selecting a suitable combination of a light conductive plate, an adhesive layer, and a transparent substrate so that the refractive indexes of these members are as close as possible to each other, in particular in the range of from 1.4 to 1.65, preferably from 1.49 to 1.60, reflection at each interface can be inhibited to improve the antireflection effect. For example, a combination of a light conductive plate made of poly(methyl methacrylate), an adhesive layer consisting of an acrylic pressure-sensitive adhesive layer, and a transparent substrate made of triacetyl cellulose can have refractive indexes in the range of from 1.49 to 1.5 and is effective in almost completely eliminating reflection at each interface.

In the light conductive plate, the incidence-side edge is not particularly limited in shape, and a suitable shape may be used. Although the incidence-side edge generally is a flat plane perpendicular to the lower surface, it is possible to employ a shape conforming to the periphery of a light source, such as, e.g., a recessed curved surface, to thereby improve the percentage incidence. Furthermore, the incidence-side edge may have an introduction part interposed between the side edge and a light source. This introduction part can have a suitable shape according to the light source, etc.

The light conductive plate can be made of a suitable material which is transparent to light in the wavelength range for the light source to be used. Examples of usable materials transparent to light in the visible light region include transparent resins represented by acrylic resins, polycarbonate resins, and epoxy resins and glasses. Preferred light conductive plates are made of a material which shows no or little birefringence.

In forming the light conductive plate, cutting may be used. A suitable method may be used for forming the light conductive plate. Preferred examples of production methods mainly from the standpoint of suitability for mass production include: a method in which a thermoplastic resin is pressed with heating against a mold capable of giving a predetermined shape to transfer the shape to the resin; a method in which a thermally molten thermoplastic resin or a resin which has been fluidized by means of heat or a solvent is packed into a mold capable of giving a predetermined shape; and a method in which a liquid resin polymerizable with heat, ultraviolet, radiation, etc. is packed or poured into a mold capable of giving a predetermined shape and the liquid resin is then polymerized.

The light conductive plate need not be a homogeneous single-layer structure made of a single material, and may be a laminate or the like composed of parts made of the same or different materials. Examples thereof include a light conductive plate comprising a light conductive part serving to transmit light and, bonded thereto, a sheet having a light-emitting means (upper surface) such as, e.g., a corrugated prismatic structure.

The thickness of the light conductive plate can be suitably determined according to the size thereof, which varies depending on uses, and to the size of the light source, etc. In the case where the light conductive plate is to be used in a reflection type liquid-crystal display, the thickness of the plate as measured at the incidence-side edge is generally up to 20 mm, preferably from 0.1 to 10 mm, more preferably from 0.5 to 8 mm.

Mainly from the standpoints of preventing perceptibility from being impaired by the disturbance of displayed images caused by scattering and of thus obtaining clear displayed images, a preferred light conductive plate has a total light transmittance with respect to incident light passing therethrough from the upper to the lower surface or from the lower or the upper surface, in particular vertically incident light passing therethrough from the lower to the upper surface, of 90% or higher, preferably 92% or higher, more preferably 95% or higher and a haze of 30% or lower, preferably 15% or lower, more preferably 10% or lower.

In the light conductive plate according to the present invention, incident light from the upper or lower surface satisfactorily passes through the lower or upper surface, and light from a light source is precisely aligned parallel and then emitted in nearly vertical directions advantageous for viewing. Due to these functions of the light conductive plate, it can be used to fabricate various apparatuses such as, e.g., a surface light source device in which the light emitted from the light source can be efficiently utilized and has excellent brightness and a reflection type liquid-crystal display which is bright, easy to view, and reduced in power consumption.

In FIG. 5 is shown a surface light source device 3 having a light conductive plate 1 according to the present invention. A surface light source device can be fabricated, for example, by disposing a light source 31 by the incidence-side edge of a light conductive plate 1 as shown in the figure. This device can be advantageously used, e.g., as a front light of the side light source type.

A suitable light source can be used as the light source disposed by the incidence-side edge of the light conductive plate. Preferred examples thereof generally include line light sources such as (cold or hot) cathode tubes, point light sources such as light-emitting diodes, an array of linearly, two-dimensionally, or otherwise arranged point light sources, and a light source employing a device which enables a point light source to serve as a linear light source in which light-emitting parts are distributed at regular or irregular intervals. Especially preferred of these are cold-cathode tubes from the standpoints of reduced power consumption, durability, etc.

In fabricating a surface light source device, a suitable auxiliary means may be used in combination therewith according to need. For example, as shown in FIG. 5, a light source holder 32 may be used which surrounds the light source 31 so as to introduce the divergent light emitted from the light source 31 into the incidence-side edge of the light conductive plate 1. Furthermore, as shown, e.g., in FIG. 6, a diffusing layer 4 may be used which is disposed on the lower surface of the light conductive plate so as to obtain even surface lighting.

Generally employed light source holders include a resin sheet coated with a thin metal film having a high reflectance, a metal foil, and the like. In the case where a light source holder is bonded to an edge part of a light conductive plate with an adhesive or the like, this bonding part of the light conductive plate need not have a light-emitting means.

The diffusing layer is disposed beforehand, if desired, on the light-emitting surface of a surface light source device, i.e., on the lower surface 12 of a light conductive plate 1, for the purposes of eliminating brightness unevenness, diminishing the mixing of adjacent light rays to avoid the generation of a moire, etc. In the present invention, a diffusing layer having a narrow diffusion range is preferred from the standpoints of maintaining the directivity of light emitted from the light conductive plate, effective light utilization, etc.

The diffusing layer can be formed by any of suitable methods without particular limitations. Examples thereof include: a method in which transparent particles having a high refractive index are dispersed in a transparent resin having a low refractive index and the dispersion is applied and cured; a method in which a transparent resin containing bubbles dispersed therein is applied and cured; a method in which the surface of a substrate is swollen with a solvent to craze the surface; a method in which a transparent resin layer having an irregularly roughened surface is formed; and a method in which a diffusing sheet formed by any of these methods is used. The irregularly roughened surface may be formed by an appropriate method mechanically and/or chemically. In a mechanical method, either a base or a coating layer of a transparent resin formed thereon is processed with a surface-roughened roll, mold, or the like to transfer the surface roughness thereto.

The transparent particles mentioned above can be suitable ones having an average particle diameter of, e.g., from 0.5 to 100 μm. Examples thereof include particles of optionally electroconductive inorganic substances such as silica, alumina, titania, zirconia, tin oxide, indium oxide, cadmium oxide, and antimony oxide and particles of crosslinked or uncrosslinked organic polymers.

As described above, the surface light source device according to the present invention is excellent in the effective utilization of light, is bright, emits light in nearly vertical directions, and can be easily made to have a large area. Consequently, the surface light source device is advantageously applicable to various apparatuses. For example, it is usable as the front light system of a reflection type liquid-crystal display or the like. The reflection type liquid-crystal display obtained is bright, easy to view, and reduced in power consumption.

Figure 6:
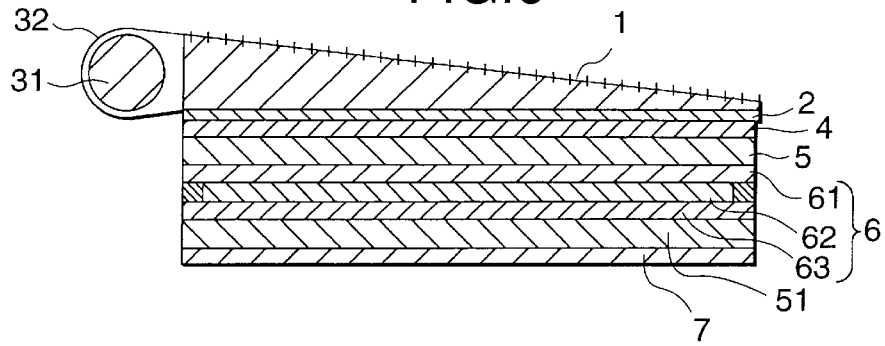
FIG. 6 is a sectional side view of a reflection type liquid-crystal display.
Figure 7:
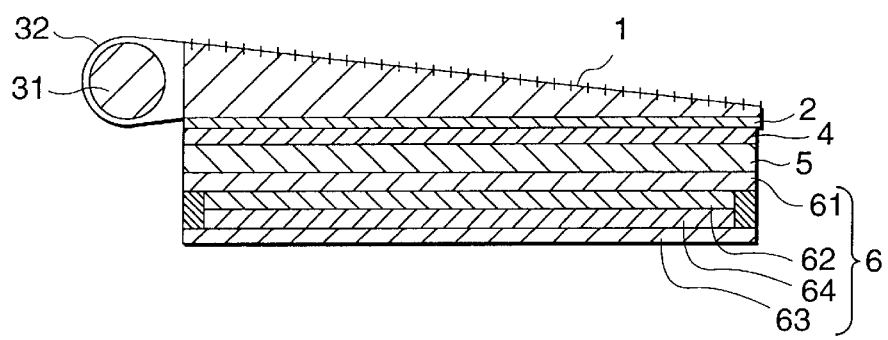
FIG. 7 is a sectional side view of another reflection type liquid-crystal display.

In FIGS. 6 and 7 are shown reflection type liquid-crystal displays each employing a surface light source device 3 according to the present invention as a front light system. Numerals 5 and 51 denote a polarizing plate, 6 a liquid-crystal cell, 61 and 63 a cell substrate, 62 a liquid-crystal layer, and 7 and 64 a reflecting layer. A reflection type liquid-crystal display can be fabricated by disposing a liquid-crystal cell 6 having a reflecting layer 7 or 64 on the light-emitting side of a surface light source device, i.e., on the lower side of the light conductive plate 1 in the surface light source device, as shown in the figures.

In general, a reflection type liquid-crystal display is fabricated by suitably assembling a liquid-crystal cell having a transparent electrode functioning as a shutter for the liquid crystal, together with the accompanying driving device and other constituent parts such as a polarizing plate, a front light, and a reflecting layer and optional parts such as a phase difference plate for compensation. There are no particular limitations in the present invention except that the surface light source device described above is used, and a reflection type liquid-crystal display can be fabricated in a conventional manner such as those shown in the figures. In the embodiment illustrated in FIG. 6, the transparent electrode is not shown.

Consequently, the liquid-crystal cell to be used is not particularly limited, and suitable one can be used. Examples thereof include, according to a classification by arrangement of oriented liquid-crystal molecules, cells of twisted or nontwisted liquid crystals, such as TN liquid-crystal cells, STN liquid-crystal cells, vertical-orientation cells, HAN cells, and OCB cells, and further include cells of a guest-host type liquid crystal and cells of a ferroelectric liquid crystal. The mode of driving the liquid-crystal cell is also not particularly limited, and a suitable one may be used such as, e.g., active matrix or passive matrix.

In a reflection type liquid-crystal display, a reflecting layer 7 or 64 is indispensable. The reflecting layer may be disposed either outside the liquid-crystal cell 6 as in the embodiment shown in FIG. 6 or inside the liquid-crystal cell 6 as in the embodiment shown in FIG. 7. The reflecting layer can be one formed by an appropriate conventional method. Examples thereof include: a coating layer comprising a binder resin containing particles of a metal having a high reflectance, e.g., aluminum, silver, gold, copper, or chromium; a thin metal deposit layer formed by vapor deposition or the like; a reflecting sheet comprising the coated layer or deposit layer supported on a substrate; and a metal foil.

In the case where a reflecting layer 64 is formed within a liquid-crystal cell 6 as shown in FIG. 7, this reflecting layer is preferably one formed by a method in which a highly electroconductive material such as, e.g., any of the aforementioned metals having a high refractive index is used to form an electrode pattern, or by a method in which a transparent electrode pattern is coated with a transparent electroconductive film made, for example, of the same material as the electrode.

The polarizing plate may be a suitable one. However, it is preferred to use a polarizing plate having a high degree of polarization, such as, e.g., an absorption type polarizer for linear polarization containing iodine or a dye, mainly from the standpoints of causing highly linearly polarized light to strike on the liquid-crystal cell and thus obtaining displayed images with satisfactory contrast.

In fabricating a reflection type liquid-crystal display, one or more appropriate optical elements can be suitably disposed. For example, a diffusing plate, anti-glare layer, antireflection film, or protective layer may be disposed over the polarizing plate on its viewing side. Furthermore, a retardation plate for compensation may be interposed between the liquid-crystal cell and the polarizing plate.

The retardation plate for compensation is intended, for example, to compensate for the wavelength dependence of birefringence, etc. to thereby improve perceptibility. In the present invention, this retardation plate is disposed, for example, between the liquid-crystal cell and at least one of the polarizing plates disposed respectively on the viewing side and the back side, according to need. As the above retardation plate for compensation, a suitable one can be used according to wavelength region, etc. For example, a retardation plate consisting of a single retardation layer or composed of two or more superposed retardation layers may be used.

Figure 8:
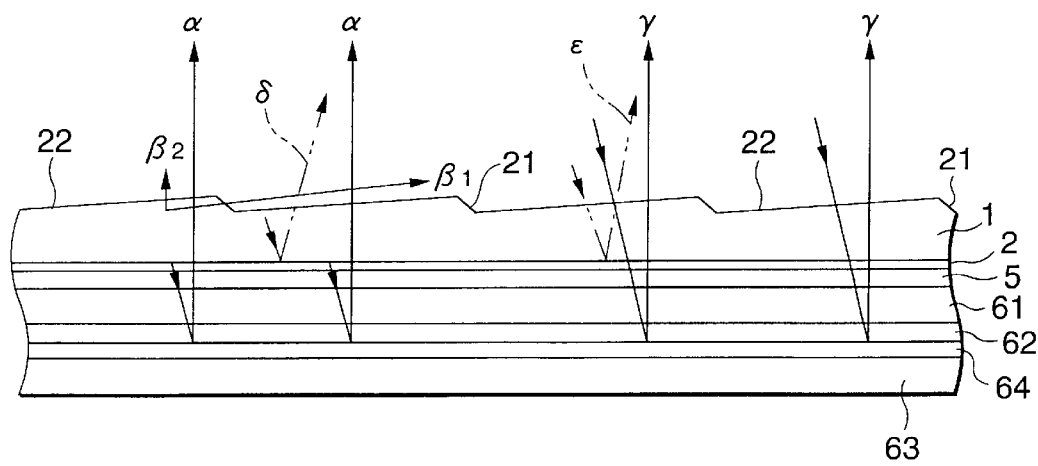
FIG. 8 is a view illustrating displayed images in one embodiment of the reflection type liquid-crystal display according to the present invention.

The reflection type liquid-crystal display according to the present invention is viewed through the surface light source device, especially by means of the light which has passed through the wide faces of the light conductive plate thereof. FIG. 8 illustrates how displayed images are viewed in the case of a liquid-crystal display having an antireflection layer 64 within the liquid-crystal cell. As shown in the figure, when the surface light source device is on, then the light α emitted from the lower surface of the light conductive plate 1 passes through underlying layers including an antireflection layer 2, polarizing plate 5, and liquid-crystal layer 62, is reflected by the reflecting layer 64, goes back through the liquid-crystal layer, polarizing plate, etc. to the light conductive plate 1, and passes through the wide faces 22. The thus-transmitted light is perceived as displayed images (α).

In the above case, intense leakage light $\beta_1$ is emitted in a direction forming a considerably large angle with the front direction perpendicular to the liquid-crystal cell, while leakage light $\beta_2$ emitted in the front direction is weak. Due to these effects brought about according to the present invention and due to the contribution of the antireflection layer, displayed images of excellent quality can be perceived through the wide faces in directions around the front direction.

On the other hand, when the surface light source device is off and the display is viewed with external light, then the light γ incident on the wide faces 22 of the upper surface of the light conductive plate 1 passes through the antireflection layer, polarizing plate, and liquid-crystal layer, is reflected by the reflecting layer, and goes back through these layers to the light conductive plate 1 as in the above-described case. As a result, displayed images (γ) can be perceived through the wide faces in directions around the front direction. The displayed images are disturbed little by the light conductive plate and hence have excellent quality.

In the above-described surface light source device and liquid-crystal display according to the present invention, optical elements or parts contained therein such as the light conductive plate, diffusing layer, liquid-crystal cell, and polarizing plate may have wholly or partly been tightly bonded together to form a united multilayered structure, or may have been stacked in an easily separable manner. However, mainly from the standpoint of inhibiting interfacial reflection to prevent contrast from decreasing, those optical elements are preferably in a tightly bonded state. It is preferred that at least the lower surface of the light conductive plate in the surface light source device and the upper surface of the liquid-crystal cell be in a tightly bonded state.

For accomplishing the tight bonding, an appropriate transparent adhesive such as a pressure-sensitive adhesive can be used. Transparent particles such as those described above or other substances may be incorporated into the transparent adhesive layer to form an adhesive layer functioning also as a diffuser, etc.

The present invention is described in more detail by reference to the following Examples, but it should be understood that the invention is not construed as being limited thereto.

EXAMPLE 1

A surface of brass which had been processed beforehand so as to have a given shape was cut with a diamond cutting tool to prepare a core for upper surface formation. This core was placed in a mold, which was heated to 100° C. A melt of poly(methyl methacrylate) was poured into the heated mold to obtain a platy shape for use in a light conductive plate. This platy shape had a length of 150 mm, width of 63 mm, incidence-side edge thickness of 2.0 mm, and opposite-side edge thickness of 0.8 mm. The lower surface (emission-side surface) thereof was flat, while the upper surface thereof was a slightly curved surface projecting upward and having a section such as that shown in FIG. 2 (b). The upper surface had a corrugated prismatic structure comprising ridges and grooves alternately arranged at a pitch of 160 μmm, wherein the narrow faces had angles of inclination ranging from 40.5 to 43.5 degrees and the wide faces had angles of inclination ranging from 1.8 to 4.9 degrees, the difference in angle of inclination between any two adjacent wide faces being within 0.1 degree. The narrow faces each had a projected area on the lower surface of from 10.7 to 21.1 μm, and the ratio of the projected area of the wide faces to the lower surface to that of the narrow faces thereto was 6/1 or larger.

Subsequently, an antireflection sheet consisting of an 80 μm-thick triacetyl cellulose film having on one side thereof an antireflection layer consisting of a five-layer dielectric film formed by vapor deposition was tightly bonded to a half of the lower surface of the platy shape through a 20 μm-thick acrylic pressure-sensitive adhesive layer in such a manner that the antireflection layer faced outward. Thus, a light conductive plate was obtained. The antireflection sheet had a reflectance of about 0.2% with respect to vertically incident light having a wavelength of 550 nm.

A cold-cathode tube having a diameter of 2.4 mm (manufactured by Harison Electric Co.) was disposed by the incidence-side edge of the light conductive plate. The cathode tube was surrounded with a light source holder consisting of a polyester film coated with vapor-deposited silver, with both ends of the film being brought into intimate contact with edge parts of the upper and lower surfaces, respectively. An inverter and a DC power supply were connected to the cold-cathode tube to obtain a surface light source device. A black-and-white, reflection type, TN liquid-crystal cell having on its back side a reflection sheet which was the same as the light source holder was disposed on the light emission side (on the lower surface of the light conductive plate) to obtain a reflection type liquid-crystal display. The on/off state of the surface light source device could be obtained by the on/off operation of the DC power supply, and the liquid-crystal display employed the drive mode in which each pixel was switched on/off.

EXAMPLE 2

A light conductive plate, a surface light source device, and a reflection type liquid-crystal display were obtained in the same manner as in Example 1, except that an antireflection sheet obtained by forming a silicone antireflection layer on a PET film by coating was used, and that the antireflection sheet was applied to the whole lower surface. The antireflection sheet had a reflectance of about 1.4% with respect to vertically incident light having a wavelength of 550 nm.

Comparative Example 1

That half of the surface light source device or liquid-crystal display of Example 1 which had no antireflection sheet on the lower surface was evaluated as Comparative Example 1.

Comparative Example 2

A surface light source device and a reflection type liquid-crystal display were obtained in the same manner as in Example 1, except that use was made of a commercial light conductive plate comprising a platy shape which had a length of 155 mm, width of 60 mm, incidence-side edge thickness of 2.0 mm, and opposite-side edge thickness of 1.0 mm and in which the upper and lower surfaces were flat. The upper surface of the light conductive plate had frostlike roughness with randomly distributed dot projections, while the lower surface thereof had no antireflection sheet. The dot projections had been arranged so that the closer to the edge opposite to the incidence side of the light conductive plate, the larger the area of the dots.

Comparative Example 3

A surface light source device and a reflection type liquid-crystal display were obtained in the same manner as in comparative Example 2, except that the same light conductive plate as in comparative Example 2 was modified, before use, by applying the same antireflection sheet as in Example 1 to the lower surface thereof.

Evaluation Tests

The surface light conductive devices and reflection type liquid-crystal displays obtained in the Examples and Comparative Examples were examined for the following properties.

Emission Intensity

Each surface light source device was switched on, and the light emitted from the center of the lower surface of the light conductive plate was examined for the angle dependence of emission intensity with a luminance meter (BM7, manufactured by Tompson Co.). The measurement was made in a plane perpendicular to both the lower surface and the incidence-side edge at various angles on both sides of the line normal to the lower surface. Each found value was multiplied by the cosine of the measurement angle θ so as to obtain a constant measurement area. The emission intensity at θ was thus determined. The direction of emission in which a maximum intensity was shown was also determined. The tube current during operation was 2.8 mA.

As a result, the maximum intensity on the lower side and the angle at which the maximum intensity was shown were 1,100 cd/m$^2$ and 12 degrees, respectively, in Examples 1 and 2 and comparative Example 1, and were 550 cd/m$^2$ and about 70 degrees, respectively, in comparative Examples 2 and 3.

Display Quality

A line pattern was displayed on each reflection type liquid-crystal display. The display was viewed, with the surface light source device being on (illuminated state) or off (unilluminated state), by randomly selected ten persons to evaluate clearness of the pattern. The maximum rating was 10 points. The results obtained are shown in Tables 1 and 2.

TABLE 1

|  | Example 1 | | Example 2 | | Comparative Example 1 | | Comparative Example 2 | | Comparative Example 3 | |
| --- | --- | --- | --- | --- | --- | --- | --- | --- | --- | --- |
|  | illuminated | unilluminated | illuminated | unilluminated | illuminated | unilluminated | illuminated | unilluminated | illuminated | Unilluminated |
| Observer 1 | 10 | 10 | 8 | 9 | 6 | 6 | 3 | 4 | 4 | 4 |
| Observer 2 | 10 | 10 | 8 | 8 | 6 | 6 | 4 | 4 | 4 | 4 |
| Observer 3 | 10 | 10 | 8 | 8 | 6 | 6 | 4 | 4 | 4 | 4 |
| Observer 4 | 10 | 10 | 8 | 8 | 6 | 6 | 4 | 3 | 4 | 4 |

TABLE 2

|  | Example 1 | | Example 2 | | Comparative Example 1 | | Comparative Example 2 | | Comparative Example 3 | |
| --- | --- | --- | --- | --- | --- | --- | --- | --- | --- | --- |
|  | illuminated | unilluminated | illuminated | unilluminated | illuminated | unilluminated | illuminated | unilluminated | illuminated | unilluminated |
| Observer 5 | 10 | 10 | 9 | 9 | 6 | 8 | 4 | 4 | 4 | 4 |
| Observer 6 | 10 | 10 | 8 | 8 | 6 | 6 | 3 | 4 | 4 | 4 |
| Observer 7 | 10 | 10 | 8 | 8 | 6 | 6 | 2 | 3 | 4 | 4 |
| Observer 8 | 10 | 10 | 9 | 9 | 8 | 8 | 4 | 4 | 4 | 4 |
| Observer 9 | 10 | 10 | 8 | 8 | 6 | 6 | 3 | 4 | 4 | 3 |
| Observer 10 | 10 | 10 | 8 | 8 | 6 | 6 | 4 | 4 | 4 | 4 |

Tables 1 and 2 show that the liquid-crystal displays of the Examples as a whole were superior to those of the comparative Examples in display clearness in both illuminated and unilluminated states. This is attributable to reduced white blurring in the displays of the Examples. Specifically, the liquid-crystal displays of comparative Examples 2 and 3 in the illuminated state suffered considerable white blurring, so that the originally black areas did not look black and normal display cannot be attained. The same troubles arose also in the unilluminated state. The line pattern was observed only in the areas having no dot projections, and the areas having dot projections had considerably reduced contrast due to irregular reflection. The liquid-crystal displays of Comparative Examples 2 and 3 thus gave abnormal display and had considerably reduced display quality due to the influence of the frostlike roughness. These two comparative liquid-crystal displays gave almost the same displayed images.

On the other hand, a comparison between Examples 1 and 2 and Comparative Example 1 shows that the formation of an antireflection layer is effective in improving display clearness in both illuminated and unilluminated states. A comparison between Example 1 and Example 2 shows that lower reflectances of the lower surface bring about better display clearness. It can be seen from the above that the degree in which originally black areas look black without white blurring considerably influences display clearness, and that it is important to inhibit white blurring to thereby prevent contrast from decreasing. Namely, the above results show that the prevention of white blurring by means of an antireflection layer is effective in improving display clearness.

In the above tests, the formation of an antireflection layer resulted in a slight decrease in brightness in white areas in the illuminated state. However, this brightness decrease was not regarded as a decrease in display quality because it was negligible as compared with the effect of preventing white blurring. The liquid-crystal displays of Example 1 and Comparative Example 1 both in an illuminated state were viewed while changing the viewing angle from the front direction toward the edge side opposite to the incidence side of the light conductive plate. As a result, in the liquid-crystal display of comparative Example 1, a distinct striped pattern of light came to be observed when the viewing angle had reached a direction inclined at about 10 degrees, and the stripped pattern continuously changed with changing viewing angle to considerably impair the display quality. In contrast, the liquid-crystal display of Example 1 did not show such a change until the viewing angle reached a direction inclined at about 30 degrees, and hence had greatly improved display quality. The above results show that the light conductive plates or surface light source devices according to the present invention realized reflection type liquid-crystal displays which were bright and easy to view.

While the invention has been described in detail and with reference to specific embodiments thereof, it will be apparent to one skilled in the art that various changes and modifications can be made therein without departing from the spirit and scope thereof.

What is claimed is:

1. A light conductive plate having, formed on an upper surface thereof, a light-emitter which deflects incident light from an incidence-side edge of the plate to emit the light through a lower surface of the plate and further having, at least on the lower surface of the plate, an antireflection layer which enables light incident from the lower surface of the plate to pass through the upper surface of the plate.

2. The light conductive plate as claimed in claim 1, wherein the antireflection layer is supported on one side of a transparent film, the film being bonded to the lower surface of the light conductive plate, with the antireflection layer facing outward.

3. The light conductive plate as claimed in claim 1, wherein said antireflection layer is formed on the upper and/or lower surface of the light conductive plate, and said antireflection layer has a reflectance of 2% or lower with respect to vertically incident light having a wavelength of 550 nm.

4. The light conductive plate as claimed in claim 1, wherein the light emitted through the lower surface has a maximum intensity, within a plane perpendicular to both the incidence-side edge and the lower surface, at an angle less than or equal to 30 degrees with respect to a line normal to the lower surface.

5. The light conductive plate as claimed in claim 1, wherein the light-emitter has a corrugated prismatic structure having narrow faces and wide faces and comprises prismatic ridges and grooves alternately arranged continuously or discontinuously at a pitch of from 50 μm to 1.5 mm, said narrow faces each having an angle of inclination of from 30 to 45 degrees with respect to the lower surface and a projected width on the lower surface of 40 μm or smaller and declining toward an edge opposite to the incidence-side edge, and said wide faces each having an angle of inclination in the range of from 0 to 10 degrees, excluding 0 degree, with respect to the lower surface, a largest difference in angle of inclination among all wide faces being within 5 degrees and a difference in angle of inclination between any two adjacent wide faces being within 1 degree, a projected area of said wide faces on the lower surface being at least 5 times a projected area of said narrow faces on the lower surface.

6. The light conductive plate as claimed in claim 5, wherein ridgelines formed by the intersection between the narrow faces and the wide faces are oriented in a direction within ±35 degrees of the incidence-side edge.

7. A surface light source device, comprising:
a light conductive plate having, formed on an upper surface thereof, a light-emitter which deflects incident light from an incidence-side edge of the plate to emit the light through a lower surface of the plate and further having, at least on the lower surface of the plate, an antireflection layer which enables light incident from the lower surface of the plate to pass through the upper surface of the plate; and
a light source disposed at or adjacent to the incidence-side edge.

8. A reflection type liquid-crystal display, comprising:
a surface light source, comprising:
a light conductive plate having, formed on an upper surface thereof, a light-emitter which deflects incident light from an incidence-side edge of the plate to emit the light through a lower surface of the plate and further having, at least on the lower surface of the plate, an antireflection layer which enables light incident from the lower surface of the plate to pass through the upper surface of the plate, and
a light source disposed at or adjacent to the incidence-side edge; and
a liquid-crystal cell disposed on a lower side of said surface light source and having a reflecting layer.

* * * * *